Jan. 29, 1963 J. L. BETZEN 3,075,507
QUADRUPLE ACTING INTERNAL COMBUSTION ENGINES
Filed March 17, 1960 3 Sheets-Sheet 1

JOHN L. BETZEN
INVENTOR.

BY
*Ely Silverman*
ATTORNEY

Jan. 29, 1963 J. L. BETZEN 3,075,507
QUADRUPLE ACTING INTERNAL COMBUSTION ENGINES
Filed March 17, 1960 3 Sheets-Sheet 2
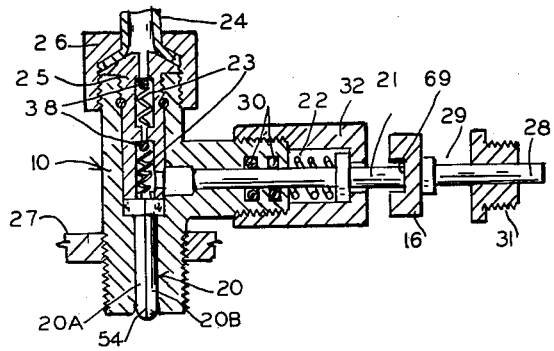
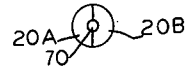
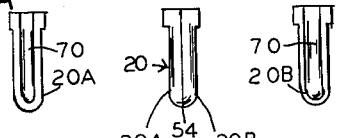
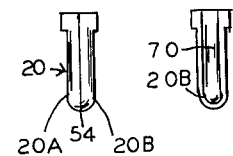
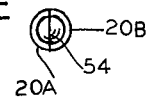
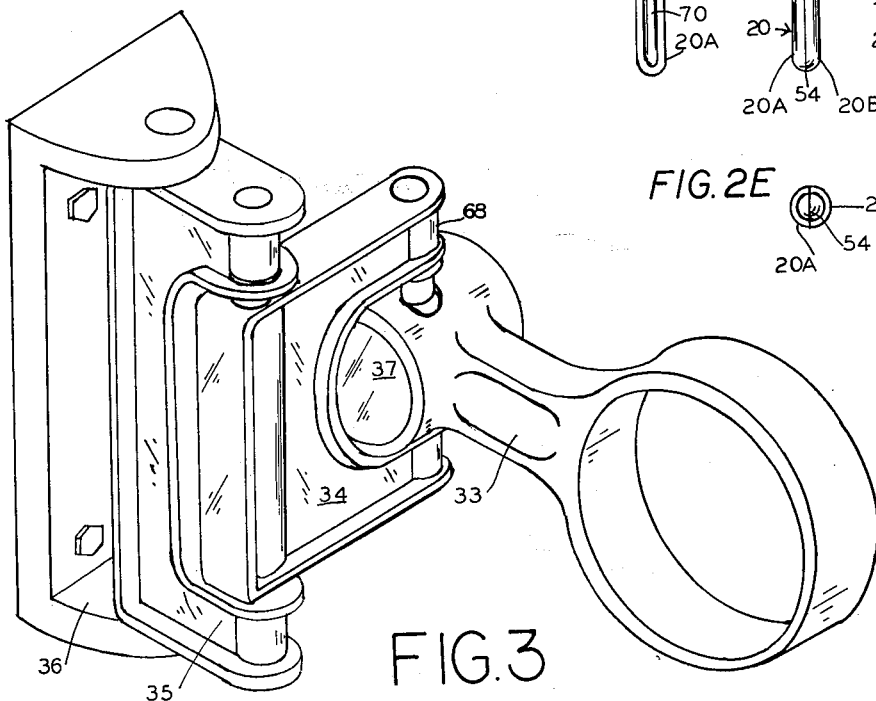
JOHN L. BETZEN
INVENTOR.
BY *Ely Silverman*
ATTORNEY Jan. 29, 1963 J. L. BETZEN 3,075,507
QUADRUPLE ACTING INTERNAL COMBUSTION ENGINES
Filed March 17, 1960 3 Sheets-Sheet 3

JOHN L. BETZEN
*INVENTOR.*

BY Ely Silverman
ATTORNEY

United States Patent Office 3,075,507
Patented Jan. 29, 1963

3,075,507
QUADRUPLE ACTING INTERNAL
COMBUSTION ENGINES
John L. Betzen, Rte. 1, Hereford, Tex.
Filed Mar. 17, 1960, Ser. No. 15,767
4 Claims. (Cl. 123—56)

This invention relates to internal combustion engines and more particularly to a quadruple acting internal combustion engine.

It is an object of this invention to provide an engine which has nonpoisonous exhaust, improved fuel economy, less heat loss because of lower friction, lighter weight per horse power, better torque advantage and is more easily balanced.

Another object is to provide an engine which could use any common fuel including liquified gas without changing carburation equipment.

Still another object is to provide an engine having less bulk so that it could be more easily incorporated into the driving axle of a motor vehicle to make the driving axle and engine one unit.

Further objects are to provide an engine which has complete exhaust scavenging, large displacement with small bulk, over one hundred percent volumetric efficiency, uniformly high atomization of fuel and the ability to use a lean mixture without loss of power or damage due to burning valves since there are no valves in the combustion chamber.

A further object of my invention is to provide an internal combustion engine which will have no valves in the combustion chamber and, therefore, can use lean mixture and high combustion temperatures without the problem of burning valves.

Figure 1:
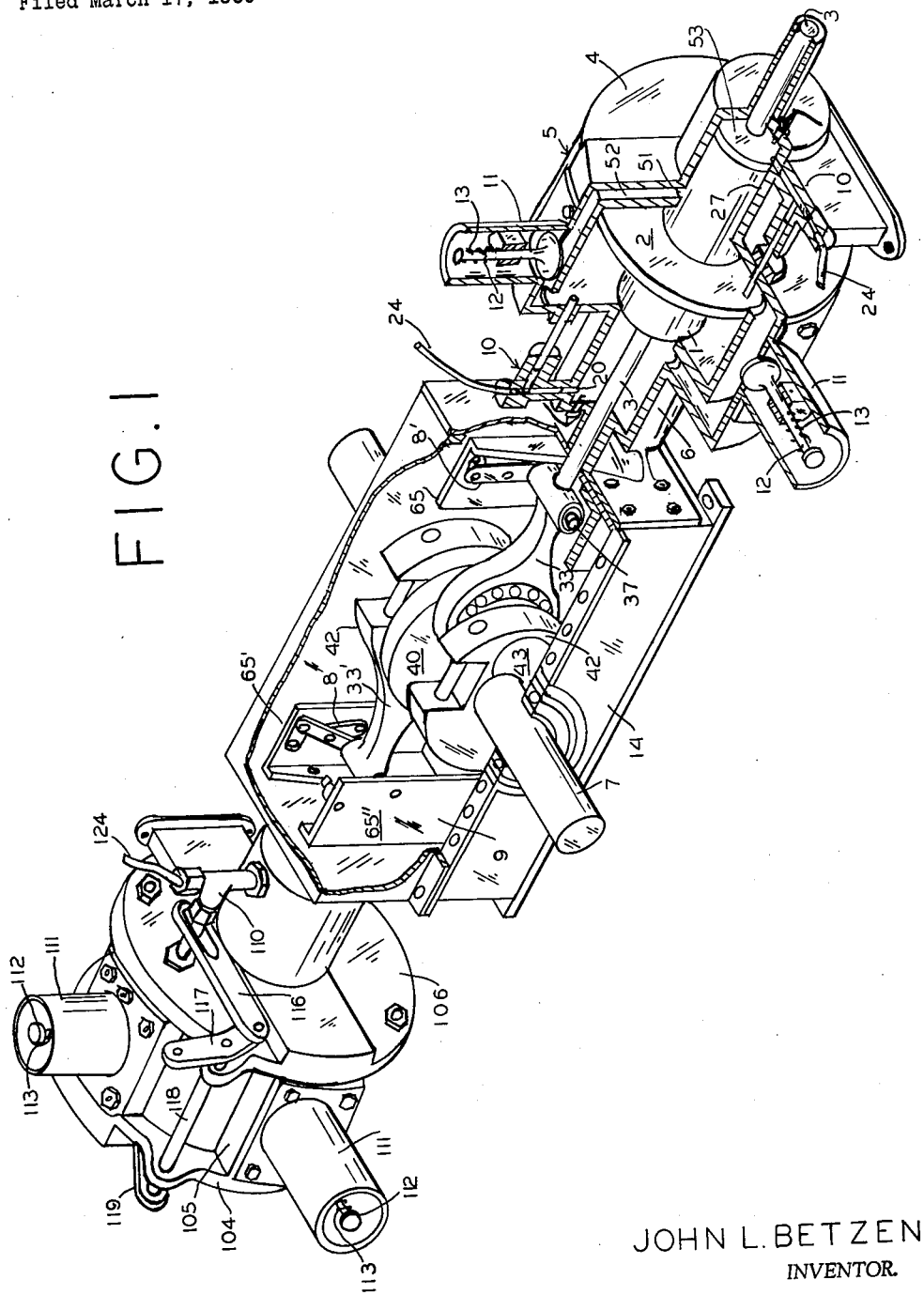
Figure 4:
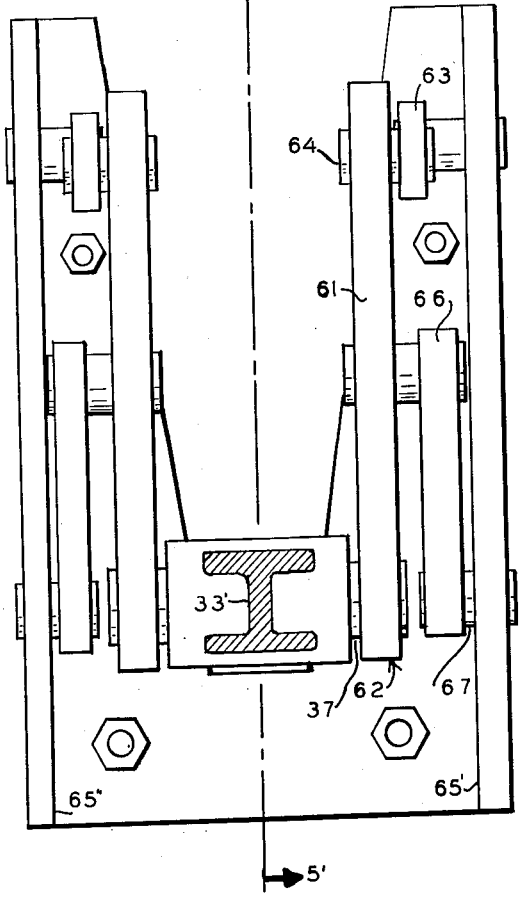
Figure 5:
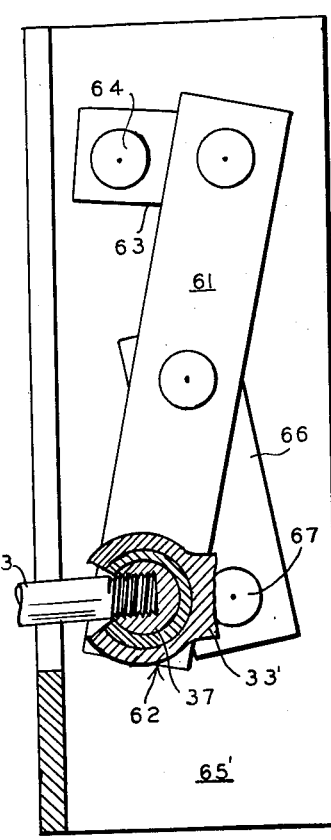

Still additional benefits and advantages of this invention will become evident from a study of the following detailed description taken in conjunction with the accompanying drawings in which:

FIGURE 1 is a perspective view, partly broken away, of an engine constructed to accomplish the objects of this invention; FIGURE 2 is an enlarged cross-sectional view of fuel injector 10 of FIGURE 1 along the axis of shaft 21; FIGURES 2A and 2B are, respectively, interior side views of elements 20A and 20B of jet 20; FIGURES 2C, 2D and 2E are, respectively, side, top and bottom views of jet 20; FIGURE 3 is a perspective view of a device according to this invention to carry the angular pressure of the connecting rod at the wrist pin; this device is a modification or substitute for the one shown as number 8 in FIGURE 1; FIGURE 4 is an end view of the arm assembly 8 partly in section along plane 4'—4" of FIGURE 5; and FIGURE 5 is a cross-sectional view, partly broken away, of the device of FIGURE 4 generally along the plane 5'—5" of FIGURE 4.

Referring to the drawings, 1 (in FIGURE 1) indicates a piston; 2 indicates a flange circumscribing and integral with said piston. The outer portion of the piston assembly is indicated as 4, the central portion is indicated as 5, and the inner portion as 6. There are two such assemblies, one on each side of the crankshaft. Thus assembled with the piston inside these parts, a combustion chamber is formed at each end of each such piston and a supercharging chamber is formed at each side of the piston flange 2. Generally, the internal combustion engine of this invention has a pair of opposedly elongated cylindrical pistons—as 1—each with a flange—as 2—around their centers and a shaft—as 3—connecting each of such pistons through connecting rods, as 33 and 33', to a central crankshaft, 7. Each of the pistons are respectively enclosed and reciprocate in their cylinder assemblies—as 4 and 104—to form a combustion chamber at each end of the piston and, also, a supercharging chamber at each side of the piston flange. Each supercharger chamber is in communication with the combustion chamber at the opposite end of the piston. Each such supercharging chamber communicates through suction valves as 11 with the atmosphere.

For convenience I will call parts and chambers which are farther from crankshaft outer and those which are nearest inner, such as outer end of piston or inner end of piston.

The operation on the device of the invention in the preferred embodiment herein described is as follows: as a piston as 1 is being driven in (i.e. in an inner direction, that is toward the crankshaft) from outer end of cylinder, the charge in the cylinder assembly is compressed by the inner end of the piston; at the same time piston flange 2 is compressing charge at its inner side and sucking in charge at its outer side; thus each piston produces four actions each cycle; hence, they are herein described as quadruple acting pistons.

As the piston as 1 continues its movement it uncovers portholes 51 allowing the charge compressed at the inner side of flange 2 to pass through connecting chamber 52 into outer combustion chamber 53, forcing exhaust gases out through exhaust ports, which are on the opposite side of the combustion chamber of said cylinder. Flange displacement is larger than piston head displacement thereby forcing all exhaust gases out from and supercharging the combustion chamber of said cylinder. Each piston flange has a larger displacement than the corresponding piston heads so it supercharges the combustion cylinder, such as 53, and provides over 100% volumetric efficiency to scavenge out all the waste gas.

As piston 1 continues to move inward flange 2 contacts fuel injector push rod 28, fuel is injected and fired; thereupon the piston movement is reversed, and a power cycle follows, beginning at inner end of the piston. Each stroke is, thus, a power stroke; a pulling impulse is delivered to the crankshaft as piston 1 moves out and a pushing impulse as it returns.

FIGURE 2 is an enlarged cross-sectional view of injector 10 showing also push rod 28 and control bar 16. This figure gives some detail of the fuel injectors which are mounted to inject fuel directly into the combustion chambers. These injectors each comprise a housing 32, plunger 21, check valves 38, seals and a jet 20; the jet 20 is constructed in two halves, 20A and 20B, which are separate from each other along their length; they are placed together and pressed into the housing with such a fit as will present a smooth closed surface to the combustion chamber. The jet 20 has a hollow interior 70, communicable with the plunger 21 and, through check valves, with the fuel line 24. The jets are pressed into the housing with such fit as will hold them in leak proof relation to the combustion chamber until the desired fuel injection pressure is reached. Thereupon said pressure opens the jet by pressing the halves apart. This provides a very thin slit through which the fuel is sprayed into the combustion chamber with a uniformly high degree of atomization, as the opening is so small that the elasticity of the housing 27 is adequate to close the jet between the pressure periods. The push rod is actuated by contact with the piston flange as the piston 1 nears the end of its stroke. Push rod actuates plunger 21 through control bar 16, thereby compressing fuel trapped inside injector housing by check valves 38. When the fuel pressure rises to a predetermined desired point jet halves 20A and 20B of jet 20 are pushed apart to open a very fine slot 54 through which fuel escapes into combustion chamber after having been thus very finely and uniformly atomized as it thus leaves the jet. As the piston 1 reverses its movement plunger 21 is returned by expansion of spring 22, pressure in interior 70 of jet 20 is relieved and jet slot 54 is closed by stress of its surrounding housing. Since the amount of movement of the jet halves in opening slot 54 is so very small the elasticity of the material of its housing can be used to allow opening of jets during pressure pulses and to close them as pressure is removed.

In FIGURE 1, number 8' is an arm assembly for the purpose of carrying the angular component of the load of connecting rod 33 on wrist pin 37, i.e. the load transmitted along a line at an angle to the axis of the shaft 3. According to this invention, therefore, there is provided an arm assembly which carries the angular force of the connecting rod at a wrist pin. One arm of said assembly is hinged on to the wrist pin and is hinged at an outer end thereof to a second arm: this second arm in turn is hinged to a mounting bracket in such a manner as to prevent lateral movement of the outer end of the first arm while, however, allowing lengthwise movement thereof. This first arm is also hinged at its center point to a third arm, which has one half the length of the first arm and, at its opposite end, is hinged to a mounting bracket at the center point of the line of the wrist pin travel, thereby cancelling the arc of the movement that otherwise would be had by the first arm and, thus, giving straight line support to the wrist pin, thus relieving sideways pressure of piston—as 1—or piston shaft—as 3—on its cylinder walls. This arm assembly comprises hinged arms and supporting brackets as 65 and 65' and 65''. Referring to the broken away section view in FIGURE 1 whereat brackets 65' and 65'' are shown, one of these assemblies (65') is described herebelow; as to that arm assembly (shown in FIGURES 1 and 4 and 5) each such assembly comprises a set of cooperating arms which cooperation is described in detail as follows.

One of these arms, 61, is hinged at one end, 62, on wrist pin 37 and on the other end is hinged to one end of a second arm 63 which arm is hinged itself at its opposite end, 64, to the mounting bracket 65'. The first mentioned arm is also hinged at its lengthwise center point to a third arm 66 having half the length of the first mentioned arm 61 and being itself hinged to mounting bracket 65', at the center point of the line of wrist pin travel. This third arm 66 thus supports the first mentioned arm 61 lengthwise of arm 61 and compensates, by providing an increased height of the hinge between the arms 61 and 66, as the vertical distance between pin 37 and said hinge increases due to the forward motion of shaft 103; arm 66 thus serves to cancel the vertical component of what otherwise would be the circular arc generated about a horizontal axis by the lower end of the first arm; arm 66 thereby provides straight line support to wrist pin 37.

FIGURE 3 shows another type of arm assembly for the same purpose as the assembly shown in FIGURES 4 and 5. This type carries the angular component of the load transmitted at an angle to the axis of the shaft as 3 or 103, by means of pins protruding laterally from the wrist pin 37. These pins 68 are hinge supported by an arm 34 which is also hinged on its opposite end by a second arm 35 which is hinged on mounting bracket 36.

Since all parts will operate equally well with crankshaft 7 rotating in either direction in the engine according to my invention, said engine may be operated with the crankshaft rotating in either clockwise or counterclockwise simply by starting it in the desired direction.

I do not show an ignition system because any conventional ignition can be used, such as electrical, hot element or compression.

Also no cooling is shown since it obviously could be either liquid or air cooled. The engine will have less heat-causing friction and a large volume of intake air which circulates around each piston body; therefore it should not require as much additional cooling as most engines.

Each piston pumps its own air, thus having a lower pumping and compressing loss than is the case when pumping is done in one cylinder, using power from another cylinder, with the necessary cylinder wall and bearing friction loss. Also it is not necessary to have intake manifold restrictions for the purposes of carburation and entrainment of fuel.

As can be seen in FIGURE 1, crankshaft 7 is built to disassemble for insertion of antifriction ball or roller bearings. This is easily done since a completely even-powered and well balanced engine can be built having only two rod journals on the crankshaft.

The load on the main bearings is greatly reduced because as one rod, as 33, exerts pressure on crankshaft the other rod 33' from a piston assembly on the other side of the crankshaft 7 (wherein the numbers for the parts thereof corresponding to the parts above-described are similarly located relative to the other side of the crankshaft and wherein such parts of such other piston assembly are given numbers 100 units higher than in the above-described cylinder assembly) exerts an equal pressure in the opposite direction, thus power impulses are balanced and converted directly into torque substantially without the necessity of exerting pressure on main bearings to produce torque, obviously reducing friction at this point. While I have above shown an internal combustion engine in which two pistons move apart and together simultaneously providing balance for each other, it is within the scope of my invention to use a multiple of two pistons moving apart and together simultaneously.

Speed is controlled by controlling the quantity of fuel injected. The quantity of fuel is controlled by movement of the control bar as 16 which has a tapered depth groove 69 into which one end of its injector plunger, as 21, is slidably fitted. Control bar 16 is movable by means of control linkage, thus controlling the length of the stroke of the plunger 21 to control the quantity of fuel injected.

Thus, according to this invention, there is provided an internal combustion engine in which the speed is controlled by controlling the quantity of fuel injected; this, in turn, is effected by adjusting the particular position of the control bar 16 which is placed between the injector 21 and the push rod 28; said control bar 16 having a groove 69 of tapering depth into which groove the end of the plunger fits so that, as the control bar is moved, as by a control mechanism therefor, the depth of the groove will serve to adjust the length of the plunger stroke and, thereby, control the quantity of fuel injected into the combustion cylinder.

The following is to explain the reasons for the claim of nonpoisonous exhaust; in the ordinary engine, even with a high-ten to one-compression ratio, approximately 20% of the exhaust gas remains in the combustion chamber. This mixes with incoming air and fuel, causes slow burning, and some of the fuel particles will naturally be surrounded or partially surrounded by exhaust gas. This prevents or hinders combination of these particles with oxygen resulting in incomplete combustion. Under these conditions, if a lean mixture is used, much of the oxygen is unused, slow burning becomes a problem and severe power loss results. To offset this a rich mixture is used thereby using all of the oxygen particles, speeding up combustion and producing full power, but leaving excess fuel particles which will be unburned or only partly burned, forming exhaust poisons. An internal combustion engine as set forth above will give the following combinations of effects, clean mixture, lean mixture, and uniformly high admission of fuel, to provide a non-poisonous exhaust because the fuel is burned to carbon dioxide instead of to carbon monoxide. Such an internal combustion engine will have a higher efficiency because of the complete burning of fuel element. The burning of fuel carbon content to carbon dioxide produces much more heat than does combustion to the carbon monoxide;

for instance, burning one pound of fuel carbon to carbon monoxide produces 4,340 British thermals of heat, while burning it to carbon dioxide produces 14,480 units. The low mechanical friction of the device is also a feature of the invention which also permits more heat energy to be available for power. A comparison of these conditions and the conditions achieved by the engine of, and as described in, this invention will show why I claim clean exhaust for this engine.

According to my invention there is provided an internal combustion engine in which each piston pumps and compresses its own air supply. Thereby, there is a lesser amount of pumping and compressing required than is the case when pumping and compressing is done by power supplied by another cylinder with consequent wall and bearing friction, as well as the expense of such additional equipment. Further, the intake and manifold restrictions for the purpose of carburation and entrainment of fuel are eliminated to provide freer flow of air into the engine.

While this invention has been described with particular reference to the construction shown in the drawing, and while various changes may be made in the detail construction, it shall be understood that such changes will be within the spirit and scope of the present invention as defined by the appended claims.

I claim:
1. An internal combustion engine comprising walls forming two co-axial opposing power cylinders on either side of a crankcase and joined thereto; a crankshaft rotatably mounted in said crankcase, the axis of said cylinders being normal to the longitudinal axis of said crankshaft, one cylindrical piston fitting in and reciprocable in the line of said axis of said cylinders in each of two said cylinders on the same side of said crankshaft, fuel and gas inlet and gas outlet orifices in the walls of each of said cylinders between each end of said piston and each adjacent end of said cylinders; each end of said piston thus forming a combustion chamber with said cylinders at each end of said piston, each of said combustion chambers being coaxial, each of said pistons being hingedly connected to a corresponding connecting rod; each such connecting rod being hingedly connected to said crankshaft, the connecting rods from each of said cylinders being connected to a point on said crankshaft diametrically opposite the point of attachment on the crankshaft whereat is attached the connecting rod from the piston located on the other side of said crankshaft, each said piston having a connection to the corresponding connecting rod at a hinge assembly located along said axis of said cylinders, said crankcase rotatably supporting each said hinge assembly, said hinge assembly comprising rigid members hingedly connected and permitting movement of said connection only longitudinally along the said axis of said cylinders.

2. A device as in claim 1 wherein the hinge assembly comprises
(a) a first rigid arm hingedly connected at one of its ends to the crankcase for rotation about an axis parallel to the crankshaft axis, and a hinge at the other end of said first arm, said latter hinge also having an axis of rotation parallel to said axis of said crankshaft,
(b) a second rigid arm hingedly attached at one end to said latter hinge, and, at its other end, hingedly attached to the connection between said piston and corresponding connecting arm, and, near its center, provided with a hinged connection,
(c) and a third rigid arm hingedly attached at one end to said crankcase, and, at its other end, to said hinge near the center of said second arm,
(d) the distance on the third arm between said hinged attachments of said third arm being the same as the distance on said second arm between said attachment of said second and third arms and the attachment of said second arm to said piston and corresponding connecting arm.

3. A device as in claim 2 wherein said hinge assembly is one of a matching pair, the second rigid arm of each said assembly is attached to said connection between said piston and corresponding converting arm.

4. An engine as in claim 1 wherein said fuel inlet comprises two matching mirror image longitudinal halves adjacent each other, and forming a hollow interior between said halves, said hollow interior communicating with a fuel line in said engine, a slot between said halves, said slot opening from said interior into the combustion chamber of said cylinder, said halves setting in a housing therefor in said cylinder walls and said housing sufficiently closely fitting around said halves and having sufficient elasticity to normally force said halves together and close the slot between said halves.

References Cited in the file of this patent
UNITED STATES PATENTS

| | | |
|---|---|---|
| 1,636,289 | Crouch | July 19, 1927 |
| 1,705,638 | Du Bose | Mar. 19, 1929 |
| 1,777,827 | Curtis | Oct. 7, 1930 |
| 1,904,854 | Clark et al. | Apr. 18, 1933 |
| 1,943,870 | Klaiber | Jan. 16, 1934 |
| 1,951,858 | Bracke | Mar. 20, 1934 |
| 2,189,258 | Thaisz | Feb. 6, 1940 |
| 2,452,193 | Huber | Oct. 26, 1948 |

FOREIGN PATENTS

| | | |
|---|---|---|
| 17,486 | Great Britain | Aug. 3, 1906 |